(12) United States Patent
Matus

(10) Patent No.: US 8,395,076 B2
(45) Date of Patent: Mar. 12, 2013

(54) ONE-PIECE CONSUMABLE ASSEMBLY

(75) Inventor: Tim A. Matus, San Antonio, TX (US)

(73) Assignee: Illinois Tool Works Inc., Glenview, IL (US)

( * ) Notice: Subject to any disclaimer, the term of this patent is extended or adjusted under 35 U.S.C. 154(b) by 2488 days.

(21) Appl. No.: 10/605,931

(22) Filed: Nov. 6, 2003

(65) Prior Publication Data
US 2005/0109736 A1    May 26, 2005

(51) Int. Cl.
*B23K 10/00* (2006.01)
(52) U.S. Cl. ........... 219/121.5; 219/121.51; 219/121.52; 219/121.48; 219/75

(58) Field of Classification Search ............. 219/121.36, 219/121.48, 121.52, 121.5, 121.49, 121.51, 219/74, 75, 121.39
See application file for complete search history.

(56) References Cited

U.S. PATENT DOCUMENTS

| 4,682,005 | A | | 7/1987 | Marhic | |
|---|---|---|---|---|---|
| 4,967,055 | A | * | 10/1990 | Raney et al. | ................ 219/121.5 |
| 5,856,647 | A | * | 1/1999 | Luo | ............................ 219/121.5 |

* cited by examiner

*Primary Examiner* — Mark Paschall
(74) *Attorney, Agent, or Firm* — Fletcher Yoder P.C.

(57) ABSTRACT

An apparatus and method of manufacturing a plasma torch consumable is disclosed. The invention includes at least two of a tip, a shielding cup, an electrode, and a swirl ring being integral to form a unitary one-piece assembly prior to being attached to the torch. Such a construction minimizes the number of parts that must be handled and orientated when connecting the consumable assembly to a plasma torch.

27 Claims, 3 Drawing Sheets

ONE-PIECE CONSUMABLE ASSEMBLY

BACKGROUND OF INVENTION

The present invention relates generally to plasma cutting systems and other high power output welding-type systems such as welding and induction heating systems and, more particularly, to a one-piece consumable for use with such systems.

Plasma cutting is a process in which an electric arc is used to cut a workpiece. Plasma cutters typically include a power source, an air supply, and a torch. The torch, or plasma torch, is used to create and maintain the plasma arc that performs the cutting. A plasma cutting power source receives an input voltage from a transmission power line or generator and provides an output voltage to a pair of output terminals, one of which is connected to an electrode and the other of which is connected to the workpiece.

An air supply is used with most plasma cutters to help start the arc, provide the plasma gas to the torch, and cool the torch. A movable or fixed electrode or consumable serves as a cathode and a fixed or moveable nozzle serves an anode. The air supply creates a force to separate the electrode and tip, as the electrode moves away from the nozzle, an arc is created, and a plasma jet is forced out through the opening in the nozzle. The plasma jet causes the arc to transfer to the workpiece, and thus initiates the cutting process. In other plasma cutting systems, a high frequency starter is used to initiate the cutting process. In either arrangement, this electrode and tip are eventually worn down and must be replaced, hence, the term consumable.

During the cutting process, as the arc transfers from the electrode to the workpiece in the plasma, substantial heat is generated. The level of heat generated is partially determined by the type of material being worked, the power output required to work the material, and the type of consumable required to effectuate the desired work. Due to the high operating temperatures, the remaining working life of certain components, called consumables, is reduced during cutting. Cutting with an overheated or overused consumable can result in poor cut quality or reduced cutting speeds. As such, replacement of the consumable tip and electrode is dependent on operating conditions and may need to be done in the middle of a cutting job.

Due to the high temperatures generated during welding/cutting processes, an operator must take special precautions to protect oneself from the heat generated during the welding/cutting processes. This protection is often in the form of thick leather gloves and coats as well as protective hoods. Wearing leather gloves limits an operator's dexterity and makes manipulation and orientation of small components relatively difficult and time consuming.

Replacing the tip or the electrode requires removing the consumable assembly from the torch. The consumable assembly can include a shield, a shielding cup, a swirl ring, a tip, and an electrode. In order to change the consumable components of the plasma torch, an operator must handle and associate each of the relatively small components into the nozzle tip of the assembly. This task can be tedious and time consuming, and is exaggerated when replacement is needed in the middle of a cutting task. That is, due to the heat of the worn components attached to the torch, an operator must often attempt to change the consumable assembly while wearing protective gloves or wait for the assembly to cool. Orientating the consumable components relative to each other, and the torch, while wearing thick leather gloves, is often a time consuming, and occasionally frustrating, procedure.

It would therefore be desirable to design a one-piece consumable that can be easily manipulated by an operator.

BRIEF DESCRIPTION OF INVENTION

The present invention is directed to a method and apparatus for a welding-type consumable overcoming the aforementioned drawbacks.

An apparatus and method of manufacturing a plasma torch consumable is disclosed. The invention includes at least two of a tip, a shield, a shielding cup, an electrode, and a swirl ring being integrated into a unitary one-piece consumable assembly. Such a construction minimizes the number of parts that must be associated when changing the consumables of the plasma torch.

Therefore, in accordance with one aspect of the present invention, a plasma torch consumable assembly is disclosed that includes a shield cup, and electrode, and a tip. Both the tip and the electrode are integrally connected to the shield cup to form a one-piece consumable assembly. The tip is constructed to secure the one-piece assembly to a torch body. Such a construction orients the components of the consumable assembly prior to connection to a torch. An operator only has to handle one relatively larger component, rather than several smaller components, when replacing the consumable, and therefore, can do so relatively rapidly.

In accordance with another aspect of the present invention, a plasma cutter is disclosed that has a power source with a torch connected thereto. The power source is configured to condition power into a form that is usable by a plasma cutting process. The conditioned power is delivered to the torch which is configured to effectuate the plasma cutting process. A tip and an electrode are both fixedly connected to a cap thereby forming a one-piece consumable assembly that is constructed to be assembled prior to being connected to the torch. The tip of the one-piece assembly is constructed to snap-fit the consumable assembly to the torch. Such a construction allows a user to replace a consumable by associating and snap-fitting the one-piece consumable assembly to the torch, rather than a plurality of individual manipulations of multiple components.

According to another aspect of the present invention, a replacement plasma torch consumable kit is disclosed which includes a shield cup, an electrode, and a tip constructed to be attached to a torch wherein at least two of the shield cup, electrode, or tip are press-fit to one another. Such a construction ensures that the proper spatial relationship is established between the two components.

According to yet another aspect of the present invention, a method of manufacturing a plasma torch consumable assembly is disclosed that includes the steps of providing an electrode, providing a tip, and integrally connecting the electrode within a perimeter of the tip into a single unitary consumable structure.

Various other features, objects, and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a one-piece consumable assembly. As will be described below, the present invention is directed to a plasma torch consumable. One skilled in the art will readily appreciate that providing a one-piece consumable will be equivalently applicable to other high power output systems such as welding systems and induction heating systems.

Figure 1:
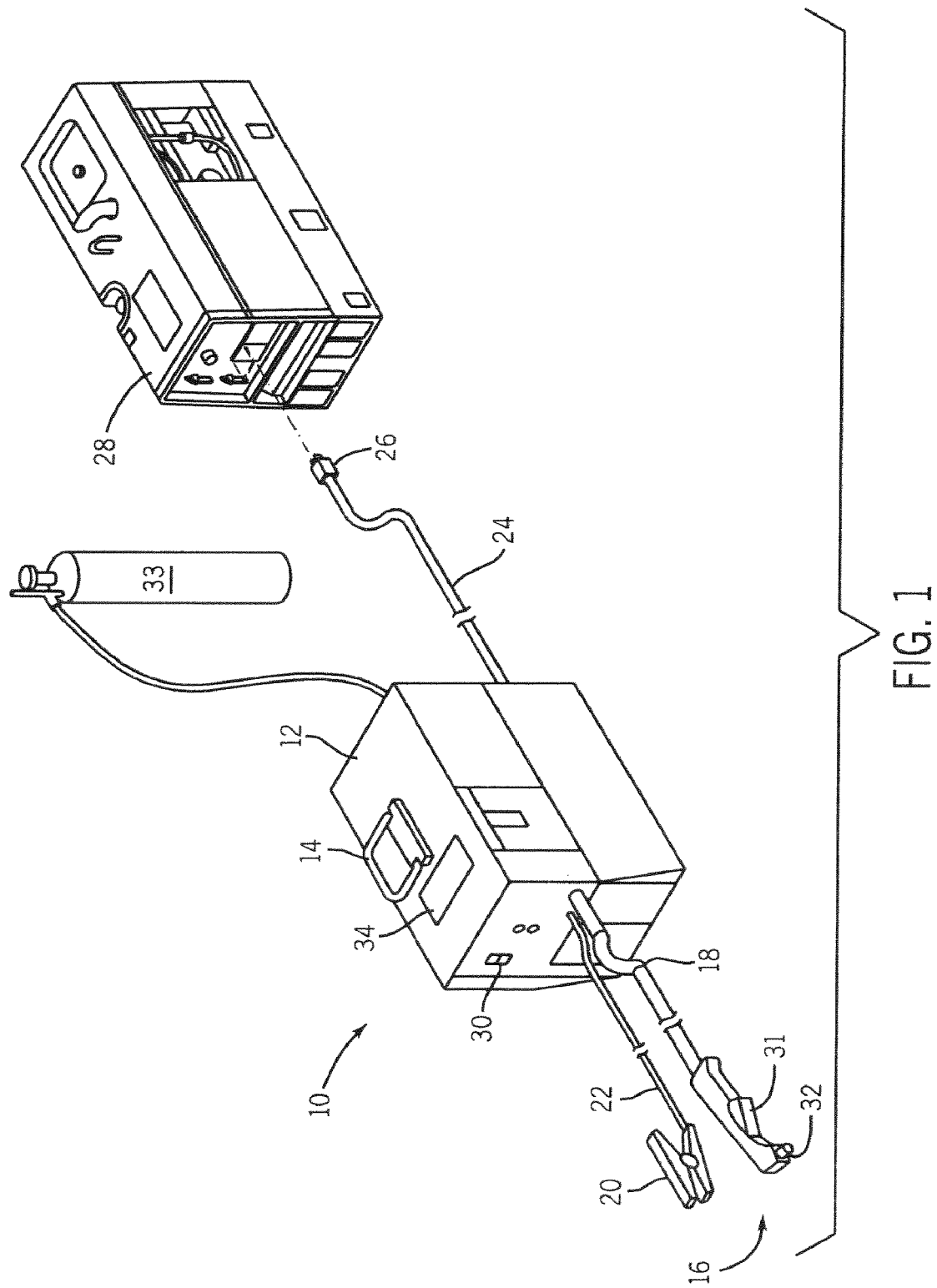
FIG. 1 is a perspective view of one plasma cutting system incorporating the present invention.

Referring to FIG. 1, a plasma cutting system 10 is shown. The plasma cutting system is a high voltage system with open circuit output voltages ranging from approximately 230 Volts Direct Current (VDC) to over 300 VDC. The plasma cutting system 10 includes a power source 12 to condition raw power and regulate/control the cutting process. Specifically, the power source 12 includes a processor that, as will be described, receives operational feedback and controls the plasma cutting system 10 accordingly. Power source 12 includes a lifting means 14, such as a handle, which effectuates transportation from one site to another. Connected to the power source 12 is a torch 16 via cable 18. The cable 18 provides the torch 16 with power and plasma, and also serves as a communications link between the torch 16 and power source 12.

Also connected to power source 12 is a work clamp 20 which is designed to connect to a workpiece (not shown) to be cut and provides a grounding path. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to either a portable power supply 28 or a transmission line power receptacle (not shown). Power source 12 includes an ON/OFF switch 30 and may also include amperage and air pressure regulation controls, indicator lights, and a pressure gauge.

To effectuate cutting, torch 16 is placed in close proximity to a workpiece connected to clamp 20. A user may then activate a trigger 31 on the torch 16 to deliver plasma and power to a work tip 32 of torch 16 to initiate a pilot arc. Shortly thereafter, a cutting arc is generated as the user moves the torch to the workpiece. The arc transfers from the electrode to the workpiece through the tip. The user may then cut the workpiece by moving the torch there-across. The user may adjust the speed of the cut to reduce spark splatter and provide a more-penetrating cut by adjusting amperage and/or air pressure. Gas is supplied to torch 16 from a pressurized gas source 33, from an internal air compressor, or an external air compressor.

Figure 2:
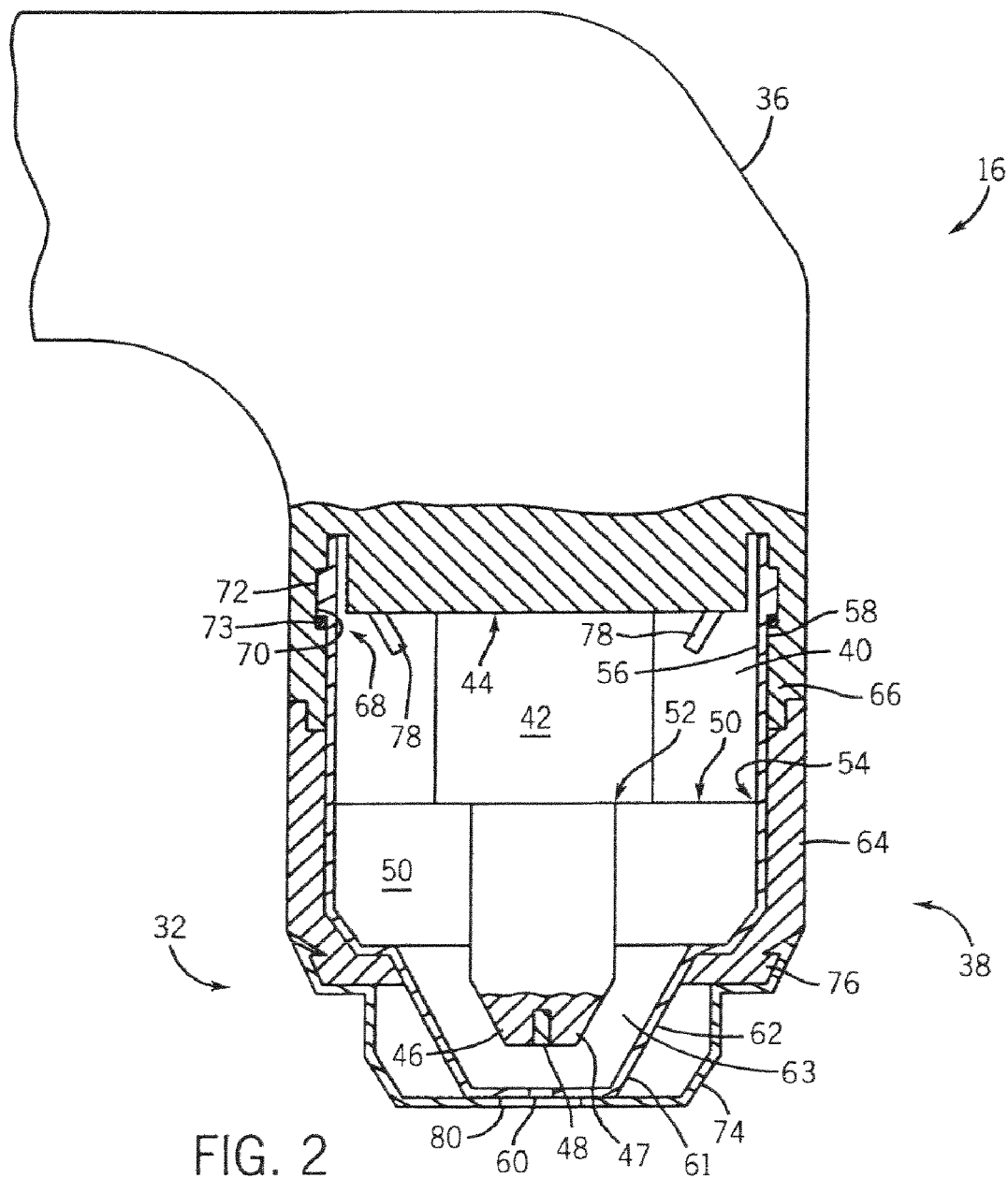
FIG. 2 is a partial cross-sectional view of a torch constructed in accordance with the present invention.

Referring now to FIG. 2, the work tip 32 of the plasma cutting torch 16 is shown in partial cross-section. Plasma torch 16 is defined by a torch body 36 that is constructed to receive a consumable assembly 38. Consumable assembly 38 is connected to torch body 36 so as to define a gas chamber 40 that, as will be described in greater detail below, allows for the charging of the gas into a plasma and passage of the plasma therethrough. Centrally disposed within gas chamber 40 is an electrode 42. Electrode 42 has a base 44 that engages torch body 36 and an electrode tip 46 at an opposite end 47 from the base 44 of the electrode 42. Electrode tip 46 has an insert 48 formed therein that exhibits certain preferred electrical, thermal, and chemical properties. Insert 48 is preferably formed of hafnium or zirconium, the importance of which is described below.

Electrode 42 is fixedly connected to a swirl ring 50. Preferably, electrode 42 is press-fit into an opening 52 formed generally in the center of swirl ring 50. An outer diameter 54 of swirl ring 50 engages an inner surface 56 of a tip 58 and secures electrode 42 and swirl ring 50 to tip 58. Tip 58 generally encircles electrode 42 and swirl ring 50 and includes an orifice 60 at an end 61 thereof. Orifice 60 is positioned generally adjacent to insert 48 of electrode 42 and is constructed to allow the passage of an electrical arc therethrough. Tip 58 also has a nozzle portion 62 formed about orifice 60 and end 47 of electrode 42. Nozzle portion 62 is constructed to direct the plasma flow from gas chamber 40 into a concentrated, highly charged, plasma flow. A plasma chamber 63 is formed in the space between electrode 42 and nozzle portion 62 of tip 58. During a cutting process, the pilot arc is generally formed in plasma chamber 63 between electrode 42 and tip 58.

A shield cup 64, or cap, passes over nozzle portion 62 of tip 58 and engages an end 66 of torch body 36. Shield cup 64 is constructed to snuggly engage tip 58 so that tip 58 is securely connected thereto. Tip 58 includes a torch end 68 with a tab 70 formed thereat. Tab 70 engages a channel 72 formed in end 66 of torch body 36 and allows consumable assembly 38 to be snap-fit connected to torch body 36. Such a construction allows electrode 42, swirl ring 50, and tip 58 to be assembled into a one-piece consumable assembly prior to being connected to torch body 36. Additionally, the construction allows the individual components of the consumable assembly to be manufactured with different processes such as stamping, extruding, or rolling, thereby reducing manufacturing costs associated with the manufacturing of the consumables. It is also understood that the relationship between tab 70 and channel 72 is by way of example. Tab 70 and channel 72 could have a variety constructions, such as a quarter-turn relationship, which would allow tip 58 of consumable assembly 38 to be quickly connected and disconnected from torch 16, or a threaded connection.

An O-ring 73 is disposed between tab 70 of tip 58 and end 66 of torch body 36 to seal the assembly and prevent the escape of gas therebetween. It is understood that swirl ring 50 is not necessary for certain plasma cutting processes and that the swirl ring is sometimes integrally connected to the torch body 36. As such, some torches do not require a swirl ring integral to a consumable assembly attached thereto. It is equally understood and consistent with the scope of the claims, that electrode 42 can be connected directly to tip 58 by other techniques rather than a swirl ring positioned therebetween. For example, an electrical isolator may be used to secure electrode 42 to tip 58.

A shield 74 is connected to shielding cup 64 about an end 76 thereof and is constructed to maintain an appropriate arc distance between insert 48 of electrode 42 and a workpiece. In operation, gas is injected into chamber 40 via a plurality of passages 78. The gas passes through swirl ring 50 and into plasma chamber 63 where it is heated to a plasma state. The plasma is then forced out of plasma chamber 63, through nozzle portion 62, and out tip 58 via orifice 60. The plasma exits consumable assembly 38 at an opening 80 in shield 74. Nozzle portion 62 is designed to focus the velocity as well as the heat of an arc that is created between a workpiece (not shown) and insert 48 of electrode 42. A cutting arc swirls about insert 48 and travels to a workpiece in the plasma flow through torch 16. Insert 48 is constructed to be conductive and to resist deterioration associated with the high temperature arc which swirls thereabout.

As plasma cutting system 10 is operated, consumable assembly 38 can become worn. Electrode 42 most often experiences wear about electrode tip 46 and insert 48. Tip 58 experiences wear about orifice 60 and shield 74 can experience wear or deterioration about opening 80. Additionally, shield 74 experiences general wear associated with being in frictional contact with a workpiece. Rather than discarding consumable assembly 38 when it becomes worn, consumable assembly 38 can be reconditioned by adding material to electrode tip 46, adding material or replacing insert 48, adding material and reshaping orifice 60 of tip 58, and adding material to opening 80 of shield 74 or replacing shield 74. Such a construction allows consumable assembly 38 to be repeatedly worn and renewed, thereby reducing costs associated with replacing the consumable components of the torch assembly. Additionally, because of the snap-fit and friction engagements between components of the consumable assembly, components that become damaged beyond a point where the individual component can be reconditioned, that particular component can be replaced while still reusing the other components.

The snap-fit engagement between consumable assembly 38 and end 66 of torch body 36 allows an operator to replace a worn consumable assembly 38 by merely orienting the consumable assembly 38 relative to torch body 36. As such, in the work environment, an operator does not have to manipulate and orient the several, relatively small, individual components of consumable assembly 38. Although shown as a snap-fit engagement between the torch body 36 and the tip 58, it is understood that other engagements, such as a threaded relationship, are within the scope of the claims included herein.

Figure 3:
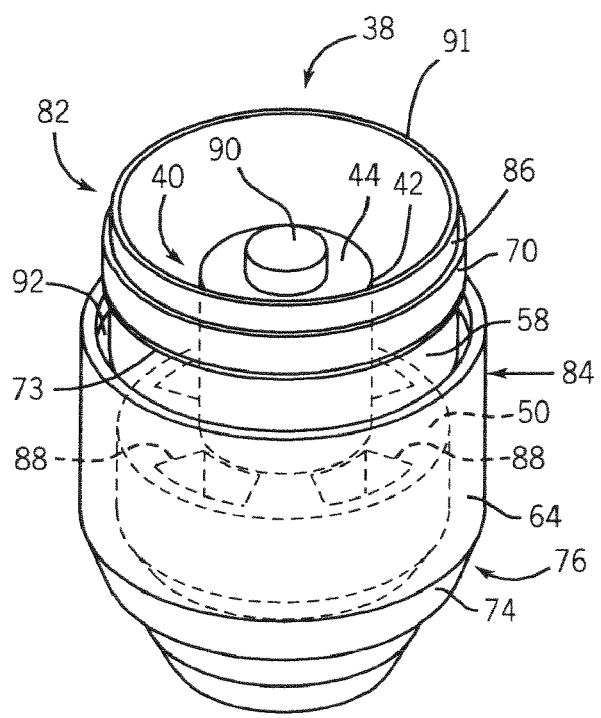
FIG. 3 is a perspective view of a one-piece unitary consumable.

FIG. 3 shows consumable assembly 38 removed from torch body 36. As shown, shield 74 is snap-fit engaged to end 76 of shielding cup 64. A portion 82 of tip 58 extends above an upper end 84 of shielding cup 64. Tab 70 extends from an outer surface 86 of tip 58 and is constructed to snap-fit to a torch body. Electrode 42 and swirl ring 50 are disposed within tip 58. Swirl ring 50, having a plurality of gas passages 88 therethrough, is constructed to be press-fit into tip 58 with electrode 42 press-fit into swirl ring 50. Base 44 of electrode 42 includes a conductor tab 90 constructed to electrically engage the circuitry of the welding-type power supply. When not connected to a torch body, electrode 42 is protected within a perimeter 91 of tip 58. A groove 92 is formed between upper portion 84 of shielding cup 64 and tip 58. Groove 92 is constructed to engage an end of a torch body. O-ring 73 is positioned below tab 70 and, when consumable assembly 38 is attached to a torch body, forms a sealed connection therebetween. O-ring 73 is merely by way of example and may not be required depending on the type of torch the consumable assembly is to be connected to and the construction of the interface between the torch and the consumable assembly. For example, tip 58 could be constructed to engage the torch with a threaded relationship or a quarter-turn construction.

Figure 4:
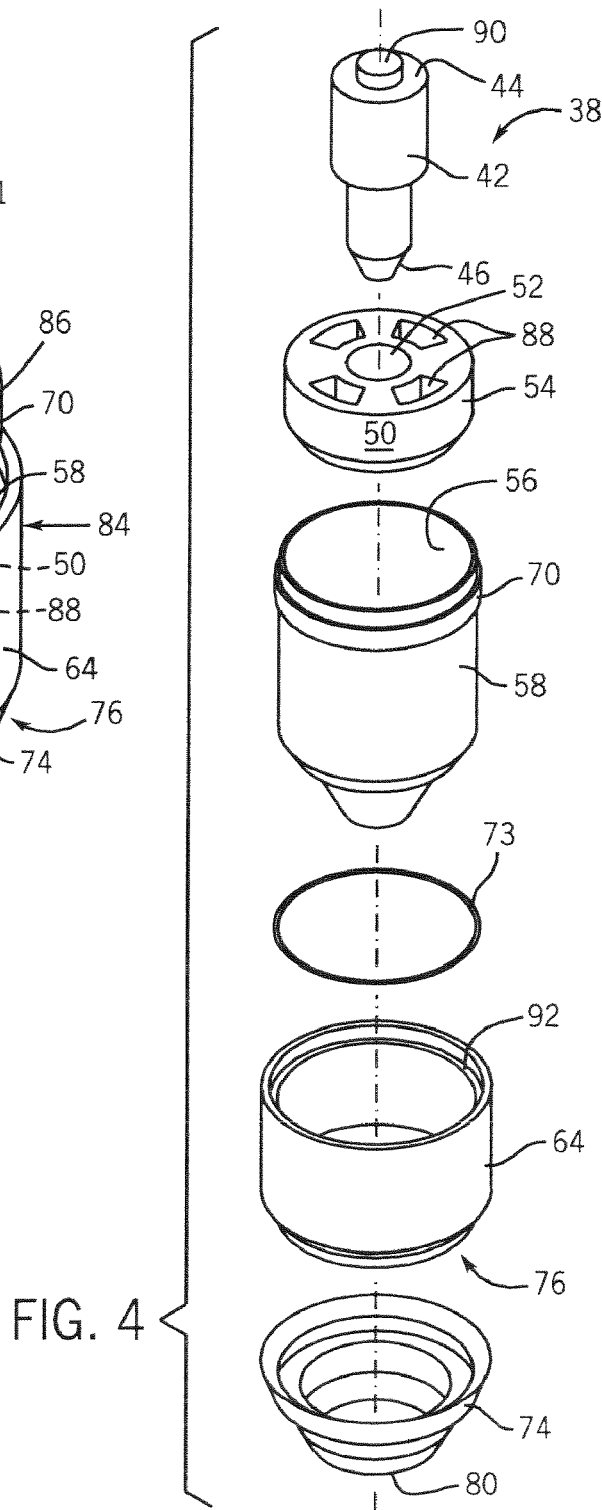
FIG. 4 is an exploded view of the one-piece unitary consumable of FIG. 3.

FIG. 4 shows the components of consumable assembly 38. Electrode 42 is constructed to be press-fit into opening 52 of swirl ring 50. A plurality of passages 88 extend through swirl ring 50 about opening 52. Swirl ring 50 has an outer diameter 54 constructed to snugly engage inner surface 56 of tip 58. Tip 58 is constructed to snugly engage shielding cup 64 with shield 74 attached at end 76 thereto. O-ring 73 is constructed to be placed below tab 70 of tip 58 when tip 58 is positioned in shielding cup 64. Groove 92 is constructed to engage an end of a torch body connected thereabout. As such, when assembled, consumable assembly 38 is constructed to be snap-fit to a torch. The components of the consumable assembly, being interconnected to each other, provide for a consumable assembly that is fully assembled prior to being connected to a torch. As such, an operator merely has to orient consumable assembly 38 relative to a torch body in order to effect a change of the consumable assembly of the torch.

As one skilled in the art will fully appreciate, the heretofore description of welding devices not only includes plasma torches, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

Therefore, in accordance with one embodiment of the present invention, a plasma torch consumable assembly includes a shield cup, and electrode, and a tip. Both the tip and the electrode are integrally connected to the shield cup to form a one-piece assembly wherein the tip is constructed to secure the one-piece assembly to a torch body. Such a construction orients each of the components of the consumable assembly prior to connection to a torch. An operator only has to handle one, relatively larger component, rather than several smaller components.

In accordance with another embodiment of the present invention, a plasma cutter includes a power source with a torch connected thereto. The power source is configured to condition power into a form that is usable by a plasma cutting process. The conditioned power is delivered to the torch which is configured to effectuate the plasma cutting process. A tip and an electrode are both fixedly connected to a cap forming a one-piece consumable assembly that is constructed to be assembled prior to being connected to the torch. The tip is constructed to snap-fit the consumable assembly to the torch. Such a construction allows a user to execute a consumable change by associating and snap-fitting the consumable assembly, rather than a plurality of individual components, to the torch.

According to another embodiment of the present invention, a replacement plasma torch consumable kit is provided which includes a shield cup, an electrode, and a tip constructed to be attached to a torch wherein at least two of the shield cup, electrode, and tip are press-fit to one another. Such a construction ensures that the proper spatial relationship is established between the two components.

In accordance with a further embodiment of the present invention, a method of manufacturing a plasma torch consumable assembly includes the steps of providing an electrode, providing a tip, and integrally connecting the electrode within a perimeter of the tip into a single unitary consumable structure. Such a method prevents a user from improperly relating the individual components of the consumable assembly.

The present invention has been described in terms of the preferred embodiment, and it is recognized that equivalents, alternatives, and modifications, aside from those expressly stated, are possible and within the scope of the appending claims.

What is claimed is:

1. A plasma torch consumable assembly comprising:
a shield cup;
an electrode integrally connected to the shield cup; and
a tip integrally connected with the shield cup and the electrode to form a one-piece assembly wherein the tip is constructed to secure the one-piece assembly to a torch body.

2. The assembly of claim 1 further comprising a swirl ring having a first side integrally connected to the electrode and a second side integrally connected to the tip.

3. The assembly of claim 2 wherein the swirl ring is constructed of one of plastic and ceramic.

4. The assembly of claim 2 wherein the swirl ring is constructed of a non-conductive material.

5. The assembly of claim 1 further comprising a shield integrally connected to an end of the shield cup.

6. The assembly of claim 5 wherein the shield is constructed of one of copper and stainless steel.

7. The assembly of claim 5 wherein the shield includes one of a gouge shield, drag shield, machine shield, and deflector.

8. The assembly of claim 1 wherein at least one of the shield cup, the electrode, and tip is reconditionable.

9. The assembly of claim 1 wherein at least one of the shield cup, the electrode, and tip is replaceable.

10. The assembly of claim 1 configured to be snap-fittable to a torch body of a plasma cutter.

11. The assembly of claim 1 wherein the consumable assembly is constructed to be secured to a torch body by rotating one of the torch body and the consumable assembly relative to the other.

12. A plasma cutter comprising:
a power source configured to condition power into a form usable by a plasma cutting process;
a torch connected to the power source and configured to effectuate the plasma cutting process;
a one-piece consumable assembly comprising:
a cap;
a tip fixedly connected to the cap and constructed to snap-fit the consumable assembly to the torch;
an electrode electrically connectable to the power source and fixedly connected to the cap; and
wherein the one-piece consumable assembly is assembled prior to being connected to the torch.

13. The plasma cutter of claim 12, wherein the on-piece consumable assembly further comprises a swirl ring fixedly connected to the cap and positioned about the electrode.

14. The plasma cutter of claim 12, wherein the one-piece consumable assembly further comprises a shield fixedly connected to an end of the cap.

15. The plasma cutter of claim 14 wherein the shield includes one of a gouging shield and a drag shield.

16. The plasma cutter of claim 14 wherein the shield is snap-fittable to the cap.

17. A replacement plasma torch consumable kit comprising:
a shield cup;
an electrode;
a tip constructed to be attached to a torch; and
wherein at least two of the shield cup, electrode, and tip are press-fit to one another.

18. The kit of claim 17 wherein each of the shield cup, electrode, and tip are secured to one another to form a one-piece assembly.

19. The kit of claim 17 further comprising a shield, snap connected to the shield cup.

20. The kit of claim 17 wherein at least one of the electrode, tip, and shield cup is reconditionable.

21. The kit of claim 17 further comprising a swirl ring having an opening constructed to receive the electrode therein in a press-fit connection.

22. A method of manufacturing a plasma torch consumable assembly comprising the steps of:
providing an electrode;
providing a tip; and
integrally connecting the electrode within a perimeter of the tip in a single unitary consumable structure.

23. The method of claim 22 further comprising the steps of providing a shield cup and integrally forming the shield cup in the single unitary consumable structure.

24. The method of claim 23 further comprising the steps of providing a swirl ring and integrally forming the swirl ring in the single unitary structure.

25. The method of claim 24 further comprising press-fitting the electrode into the swirl ring and press-fitting the swirl ring into the tip.

26. The method of claim 22 wherein the step of integrally connecting includes the step of molding the electrode and tip in the single unitary structure with an electrical isolator therebetween.

27. The method of claim 26 wherein the step of integrally forming includes the step of casting the electrode and tip in the single unitary structure with an electrical isolator therebetween.

* * * * *